(12) United States Patent
Thomann et al.

(10) Patent No.: US 6,510,226 B1
(45) Date of Patent: Jan. 21, 2003

(54) DUAL NETWORK HOUSING DEVICE

(75) Inventors: Brian J. Thomann, Tewksbury, MA (US); Michael A. Zimmerman, North Andover, MA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/489,321

(22) Filed: Jan. 21, 2000

Related U.S. Application Data

(63) Continuation-in-part of application No. 08/976,713, filed on Nov. 24, 1997, now abandoned.

(51) Int. Cl.[7] ............................................... H04M 1/00
(52) U.S. Cl. ................................................ 379/413.04
(58) Field of Search ........................ 379/413.04, 399.01; 361/654, 658

(56) References Cited

U.S. PATENT DOCUMENTS

| | | | | |
|---|---|---|---|---|
| 4,910,770 A | * | 3/1990 | Collins et al. | 379/413.04 |
| 5,363,440 A | * | 11/1994 | Daoud | 379/413.04 |
| 6,078,661 A | * | 6/2000 | Arnett et al. | 379/413.04 |

* cited by examiner

*Primary Examiner*—Jack Chiang
(74) *Attorney, Agent, or Firm*—Lowenstein Sandler, P.C.

(57) ABSTRACT

An improved network housing device for protecting telecommunications and electrical systems disposed in the outdoors from foreign objects and influences of the weather and atmosphere comprises a dual enclosure device having an outer enclosure and an inner enclosure unit. With this dual structure, requirements imposed by outdoor use can be allocated among the outer and inner units, with the outer unit fulfilling weatherability and ultra-violet stability requirements, and the inner unit fulfilling low-flammability requirements. The device may be fabricated entirely with plastic to provide a reliable and low-cost housing.

20 Claims, 4 Drawing Sheets

DUAL NETWORK HOUSING DEVICE

RELATED APPLICATIONS

This application is continuation-in-part application of, and claims the benefit of the priority date of, U.S. patent application Ser. No. 08/976,713, filed Nov. 24, 1997, now abandoned. This application also is related to U.S. patent application Ser. No. 08/976,708, filed Nov. 24, 1997, by inventors Thomann and Choi, titled "Multi-Layered Polymer Structure For Fabricating Housings for Communications and Electrical Products," assigned to Lucent Technologies, Inc., the assignee herein.

FIELD OF THE INVENTION

The present invention relates to an improved network housing device, and more particularly, to an improved device for protecting communications and electrical systems disposed in the outdoors from foreign objects and degradation from weathering.

BACKGROUND OF THE INVENTION

Cables, wires, and circuit boards of communications and electrical products at times must be mounted in the outdoors, for example, on the exterior of a plant house, or other building. Traditionally, metal housings such as network interface units have been used to encase the equipment in these settings to protect them from weathering, ie., degradation from moisture, temperature changes, ultra-violet rays of the sun, atmospheric contaminants, and so forth. (For ease of reference, the term "network" is used to collectively refer to all types of cables, wires, or circuit boards of communications, electrical, or optical products and also encompasses parts of such systems including wireless systems).

Metal enclosures predominantly have been used for these applications because metal is highly reliable, that is, it maintains its structural integrity over long periods of time and provides excellent protection against foreign matter and environmental influences, such as damaging ultra-violet rays. A metal housing device for outdoor mounting is described, for example, in U.S. Pat. No. 5,550,916 issued Aug. 27, 1996, to Daoud, titled "Telecommunications Equipment Terminal," and assigned to Lucent Technologies, Inc., (the.assignee herein), which is hereby incorporated by reference. As discussed in the Daoud '916 patent, it is difficult to provide sufficient protection for these units from the outdoor elements. Reliability and structural integrity is a significant concern for the housing devices as defects in the housing could cause disruption in electrical or telecommunications service, having a drastic and unacceptable impact on the daily lives, responsibilities, or conveniences of the users.

While metal enclosures demonstrate high reliability, there are drawbacks associated with their use, particularly as relates to cost. Metal housings are more expensive than plastic housings, and they often require hinges, gasketing, and rubber sealing materials which further increase the complexity of the housing and cost. The impact of the increased cost of metal as compared with plastic becomes more dramatic as the volume of the number deployed increases. Metal also is less flexible and heavier than plastic, limiting device configurations and installation parameters.

However, plastic enclosures have been considered unsuitable for outdoor housing units for protecting electronics due primarily to reliability constraints. Challenges have been encountered in developing plastic network housings that meet the stringent requirements dictated by outdoor use, such as good chemical resistance, flame retardance, effective radio-frequency (RF) shielding, and maintenance of structural integrity and stability in the face of weather and ultra-violet ray influences over a long operating life and large range of temperatures (i.e., −40° C. to 70° C.). Generally, available polymers can be used to produce a housing that will meet some, but not all, of these requirements. For example, with present device configurations and using currently available polymers, a housing could be fabricated having good fire resistance properties, but the same housing may not exhibit ultra-violet stability or meet all other requirements dictated by outdoor use.

Previous housing units are shown in U.S. Pat. No. 5,537,456 to Bonvallat et al. and U.S. Pat. No. 4,910,770 to Collins. These designs exhibit drawbacks as applied to the outdoor mounting of telecommunications equipment. For example, the Collins patent states that its device is adapted for indoor use or for use in situations where complete isolation of the subscriber and telephone company terminals is not required (col. 2, l. 49–52). The Collins patent calls for a "Dutch door" arrangement, wherein two covers are hinged onto the rear base of the unit. Equipment is secured adjacent the rear wall of the unit (e.g., FIGS. 11 and 19), and thus, is not isolated or insulated from outdoor influences. The covers are designed to provide security for telephone terminals which themselves are weather protected (e.g., col. 2, l. 49–50). For example, Collins states the user can gain access to the equipment behind cover 3 by "unfastening screw 15 disposed in tab 17 of cover 3 . . . " (Col. 5, l. 50–52). FIG. 3 of Collins shows access holes 27, 29 in the base of the unit, and FIG. 6 shows the equipment disposed within the unit, below cover 3, adjacent access holes 27, 29. There is no barrier between the equipment and the rear wall 1a of the base, and thus, no protection from outdoor influences. Similarly, FIGS. 7 and 8 of Collins show the equipment housed within the unit, against the rear wall 1a of the base, adjacent access holes 27, 29. Likewise, in the Bonvallat design, components are mounted adjacent the rear wall of the unit and/or adjacent the top face wall of the unit (e.g., FIG. 3), and thus, there is little protection from outdoor influences.

Accordingly, there is a need for an improved network housing device. The invention addresses these needs by providing a housing having a structure which allows for use of plastic in fabrication and which may be used to protect printed circuit boards of telecommunications equipment from outdoor influences, overcoming previously-mentioned limitations. Further advantages may appear more fully upon considering the description below.

SUMMARY OF THE INVENTION

Summarily described, the invention embraces a dual enclosure device for housing telecommunications or electrical equipment in the outdoors comprising at least an outer enclosure unit and an inner enclosure unit. The inner enclosure unit encases the telecommunications or electrical equipment and is fabricated from a material exhibiting flame retardance properties, and the outer enclosure unit encases the inner enclosure unit and is fabricated from a material exhibiting resistance to weathering. In one embodiment, the outer enclosure unit comprises two parts, a face portion (or external cover) and a rear portion (or shroud), and the inner enclosure unit comprises three parts, a base plate for providing a central structural unit, an internal cover for protecting the circuit board of the network, and an access door for providing an accessible cover over field serviceable components. Advantageously all parts are fabricated with plastic and are fastened together with use of plastic attachments, with all internal areas accessible through hinged doors and the mating surfaces sealed with a tongue and groove seal.

BRIEF DESCRIPTION OF THE DRAWINGS

For a better understanding of the invention, an exemplary embodiment is described below, considered together with the accompanying drawings, in which:

FIGS. 2A–2C show the parts of the embodiment of FIG. 1 in which:

FIG. 2A shows a perspective view of the unit looking at the top surface with the external cover removed;

FIG. 2B shows a cross-sectional side view of the unit taken along the line B—B of FIG. 2A; and FIG. 2C shows a cross-sectional side view of the unit taken along the line C—C of FIG. 2A;

It is to be understood that these drawings are for the purposes of illustrating the concepts of the invention and are not to scale.

DETAILED DESCRIPTION OF THE INVENTION

Applicants have discovered that challenges encountered in developing plastic network housing devices meeting stringent requirements dictated by outdoor use, such as good chemical resistance, flame retardance, effective RF shielding, and structural integrity, can be overcome by use of a dual enclosure device comprising an outer enclosure and an inner enclosure unit, wherein the inner unit encases the telecommunications equipment and the outer unit encases the inner unit. With this dual structure, the comprehensive set of requirements imposed by outdoor use can be allocated among the outer and inner units, e.g., the outer unit can fulfill weatherability requirements while the inner unit fulfills flame-retardance requirements.

In FIGS. 1A through 4, the invention is illustrated with reference to a network interface unit 10 having five components. It should be appreciated, however, that the invention is applicable to other communications or electrical equipment which is to be mounted outdoors, including wired and wireless systems, telephony, video, and data transmission systems, and to other embodiments than those illustrated.

Figure 1A:
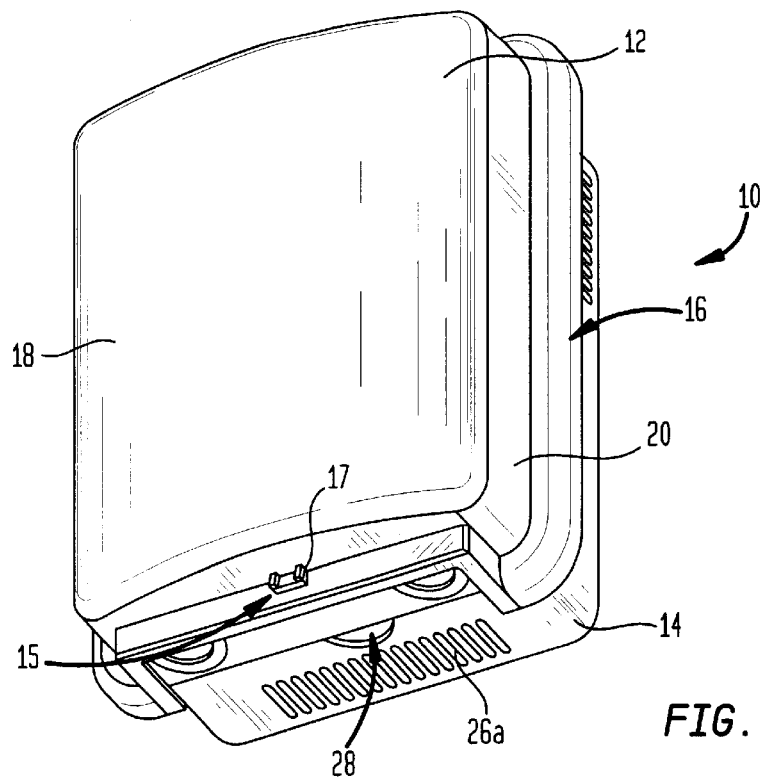
FIG. 1A shows a perspective view of one embodiment of the inventive dual enclosure device in its closed position looking at the top (face) surface.
Figure 1B:
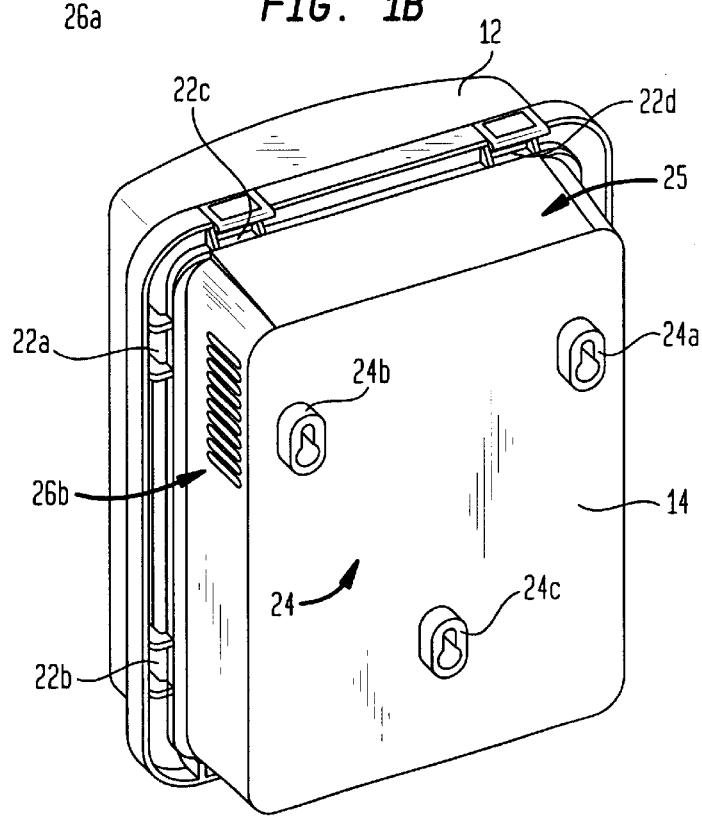
FIG. 1B shows a perspective view of one embodiment of the inventive dual enclosure device in its closed position looking at the bottom (rear) surface.

More particularly with reference to the Figures, FIG. 1A shows a perspective view of the inventive housing unit 10 in a closed position looking at the top face surface, and FIG. 1B shows a perspective view of the same embodiment but looking at the rear bottom surface. In this embodiment, the unit 10 comprises five components, although in FIGS. 1A and 1B, only two components of the outer enclosure unit, namely, the external face cover 12 and external rear cover 14 (also, referred to herein as the "shroud"), are visible. The external face and rear covers are shown substantially in the shape of a rectangular box top and bottom, respectively (i.e., each having a primary surface [18, 24] and a four-walled side surface [20, 24]), although other configurations and shapes are contemplated. For example, the external cover and shroud could be square, dome-shaped, i.e., rounded or elliptical, with the important consideration being that they be sized to encase both the equipment to be protected and the inner enclosure unit.

As reflected in FIGS. 1A and 1B, only the external face cover 12 and external rear cover 14 are exposed to the elements when the unit 10 is closed. The equipment is contained within an internal cover unit defined by an internal cover 32 and base plate (FIGS. 2A–2C), and thus, there are two enclosures surrounding the equipment. The only internal part visible in FIGS. 1A and 1B is a flap 15, which protrudes from a slot 17 in the external cover 12 to provide a seal; the flap 15 is preferably integrally formed with a base 30 of the internal cover unit, shown in FIGS. 2A–2C, discussed below. The external face cover 12 has a lip 16 extending beyond the cover top surface 18 and sides 20 to prevent precipitation from entering the housing, to form a seal with the rear cover member and/or base, and to cover connective hinges 22a, 22b, 22c, 22d, which are used to couple the parts together.

Referring to FIG. 1B, the shroud 14 has a plurality of mounting rings 24a, 24b, 24c on its primary surface 24 for mounting the unit 10, such as on the exterior of a building. The shroud 14 further may have on its side surface 25 a plurality of vents 26a, 26b, to allow for the dissipation of heat and one or more apertures 28 to allow for the passing of a cable through it. Preferably, the vents 26 and cable aperture(s) 28 are disposed so that when the unit is secured to a building, the vents and aperture(s) open downwardly toward the ground to prevent precipitation, dust, or other contaminants from entering the housing, as illustrated in FIG. 1A, i.e., 26a. Vents also may be placed on a vertically-disposed side of the shroud, as shown in FIG. 1B (26b), in which case any precipitation entering the unit will be barred from contacting the telecommunications equipment by the internal cover (as will become apparent with the description below), and will be caused through the force of gravity to drip out of the device through vents 26a at the bottom, shown in FIG. 1A.

Figure 2A:
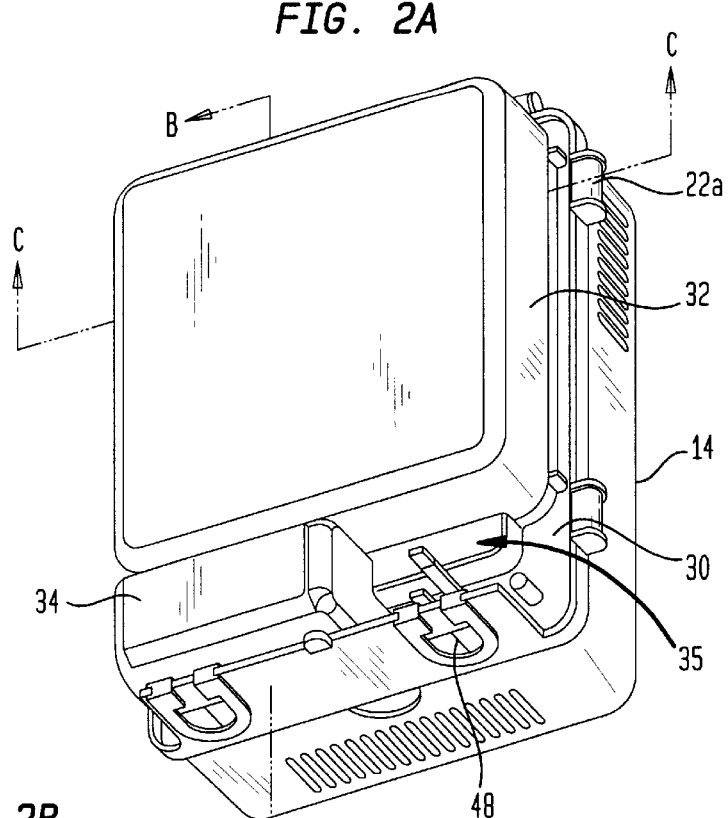
Figure 2B:
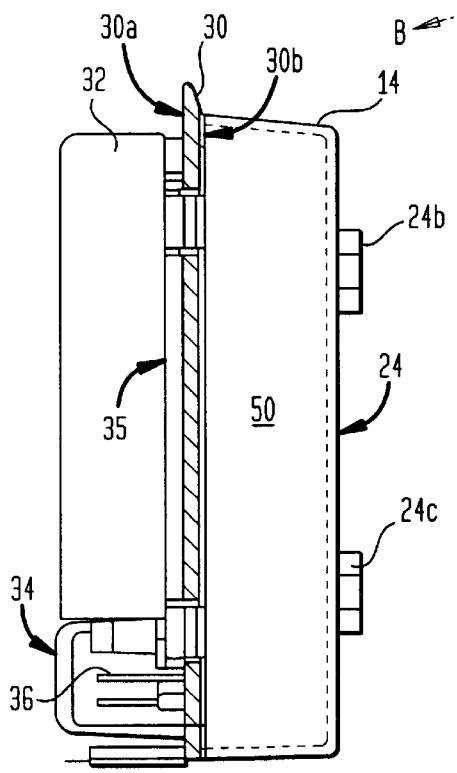
Figure 2C:
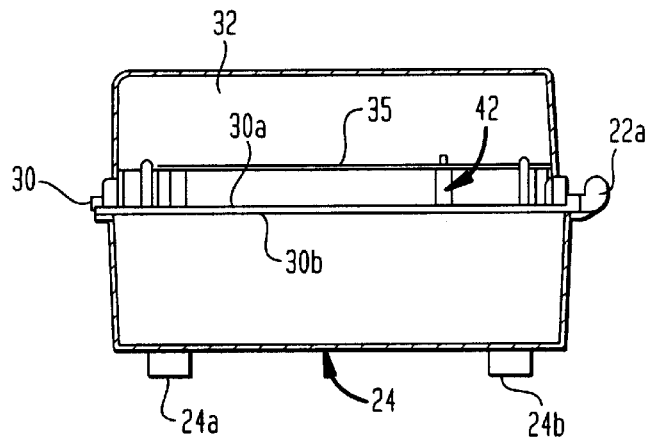
Figure 3:
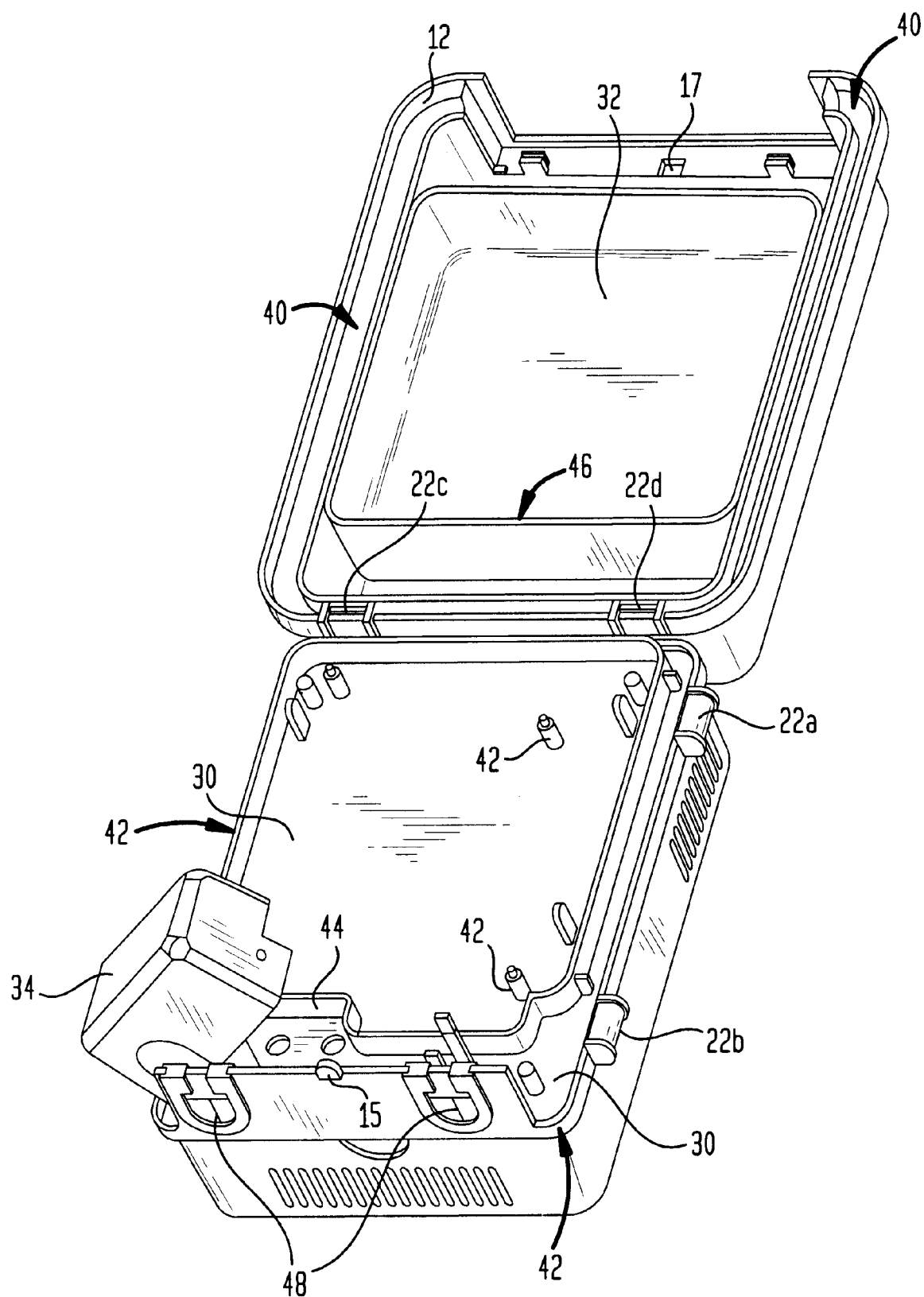
FIG. 3 shows a perspective view of one embodiment of the inventive dual enclosure device in an open position.

Referring to FIGS. 2A through 2C, there are shown the internal components of the embodiment of the housing device of FIGS. 1A and 1B. A central base plate 30 is provided. It is mounted on the periphery of the rear cover member so that an insulating layer or enclosed cavity of air 50 is disposed between the rear wall 14a of the rear cover member 14, even when the top face external cover 12 is removed. FIG. 2A shows a perspective view of the unit looking at the top surface with the external face cover removed; FIG. 2B shows a cross-sectional side view taken along the line B—B of FIG. 2A; and FIG. 2C shows a cross-sectional side view taken along the line C—C of FIG. 2A. As can be seen in these figures, the inner enclosure unit provides a separate unit, fully enclosing and surrounding the equipment, and the inner enclosure unit is then fully surrounded by he external enclosure unit (i.e., defined by the face and rear external covers 12, 14), thus defining the dual enclosure unit. The internal enclosure unit preferably comprises three parts as shown, namely, a base plate 30, an internal cover 32, and a craft access door 34. The base plate 30 serves as a central structural element in that all other parts may be connected to it and thereby coupled together. The base plate 30 provides a bottom surface for both the internal cover 32 and access door 34, and it separates the telecommunications or electrical equipment from both the shroud 14 and the external cover 12 with a layer of air 50 is disposed between them.

Preferably, the base plate 30 has a top face surface 30*a* and a rear surface 30*b* (FIG. 2A and 2B). A printed circuit board 35 is snapped directly onto the face surface 30*a* of the base plate 30, with the use of one or more pins 42. The internal cover 32 is then snapped over the base plate 30 and circuit board 35. The circuit board 35 itself does not contain any field serviceable components and thus, with the internal cover 32 secured over it, the circuit board is protected. However, the tip and ring telephony wires 36 of the network for a connection may be placed on a separate section of the base plate and encased by the access door 34. This way, a technician or other user may gain access through the access door 34 to the tip and ring telephony wires 36 without having to expose the circuit board 35 encased within the internal cover 32. In FIG. 2A, a portion of the board 35 is shown protruding from the cover 32 in coupling the board to the serviceable parts 36, but otherwise, the board is fully enclosed within the internal enclosure unit.

With this configuration and the use of plastic in fabricating the parts, a weather-tight device can be provided without the use of gaskets, seals, or screws. Instead, the parts are snap-fit and hinged together. For example, referring to FIG. 3, a perspective view of the embodiment of FIGS. 1–2 is shown in an open position, with the internal cover 32 disposed within the external face cover 12, and the access door 34 partially opened. As can be seen, there is a groove 40 disposed along the periphery of the external face cover 12 which corresponds to a tongue 42 disposed along the periphery of the shroud 14. When the external face cover 12 is placed over the shroud 14, the tongue 42 of the shroud snap-fits into the groove 40, sealing these parts together.

Other plastic means of attachment may comprise hinges used to couple the base plate 30 to the shroud (22*a*, 22*b*), or the external face cover to the shroud (22*c*, 22*d*), and/or to connect the other components so that the device is provided to the user as one substantially integral unit. Plastic attachments may also comprise a flap 15 and slot 17 seal (shown in FIG. 1A), or a rim and edge-seal, i.e, a rim 44 protrudes from the base plate 30 which is sized slightly smaller in circumference than the peripheral edge 46 of the internal cover 32 so the cover 32 will snugly fit over the rim 44. Any known means of attaching substrates with plastic parts may be used. The rim 44 also may be sized to correspond in dimension to the periphery of the circuit board 35 to aid in retaining the board 35 on the plate, as shown in FIG. 2A. Rubber seals optionally may be placed in grommets 48 for surrounding one or more cables, fibers, or wires passing through them.

Figure 4A:
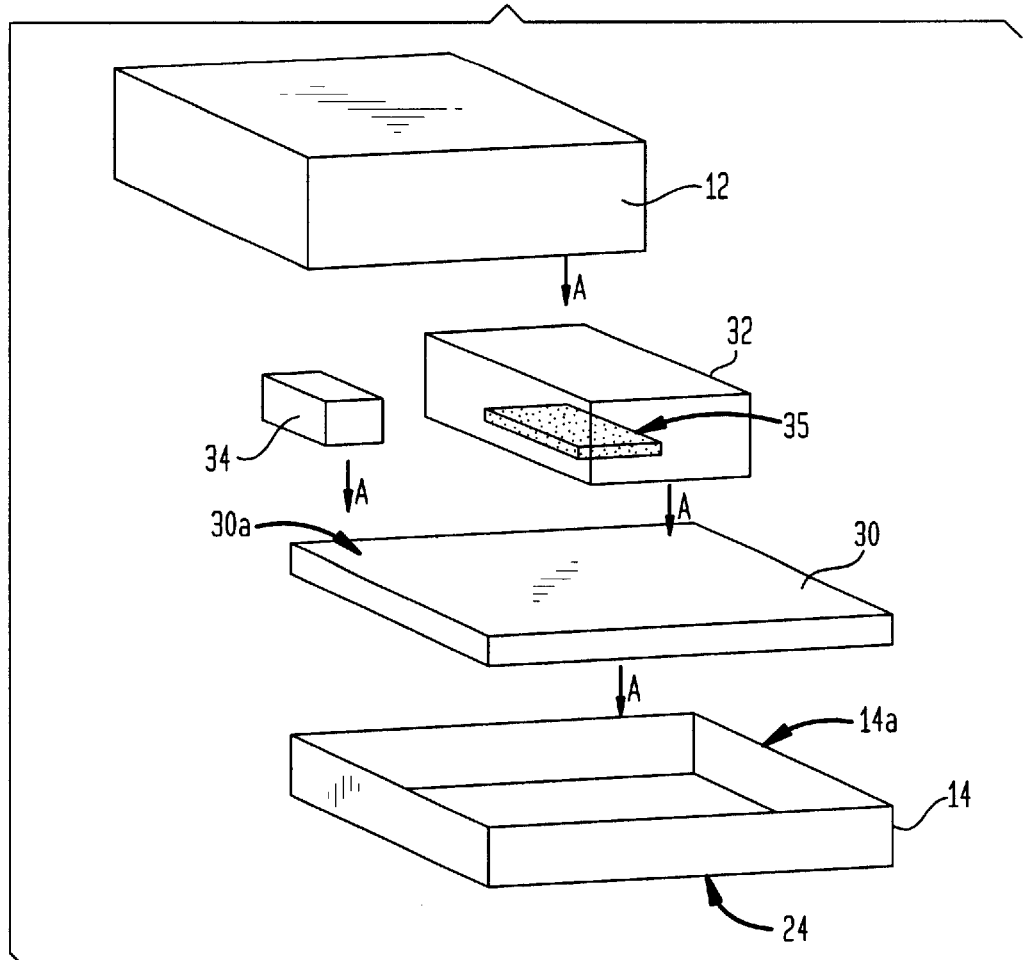
FIGS. 4A–4B schematically illustrate the components of one embodiment of the inventive dual enclosure device and their method of use.
Figure 4B:
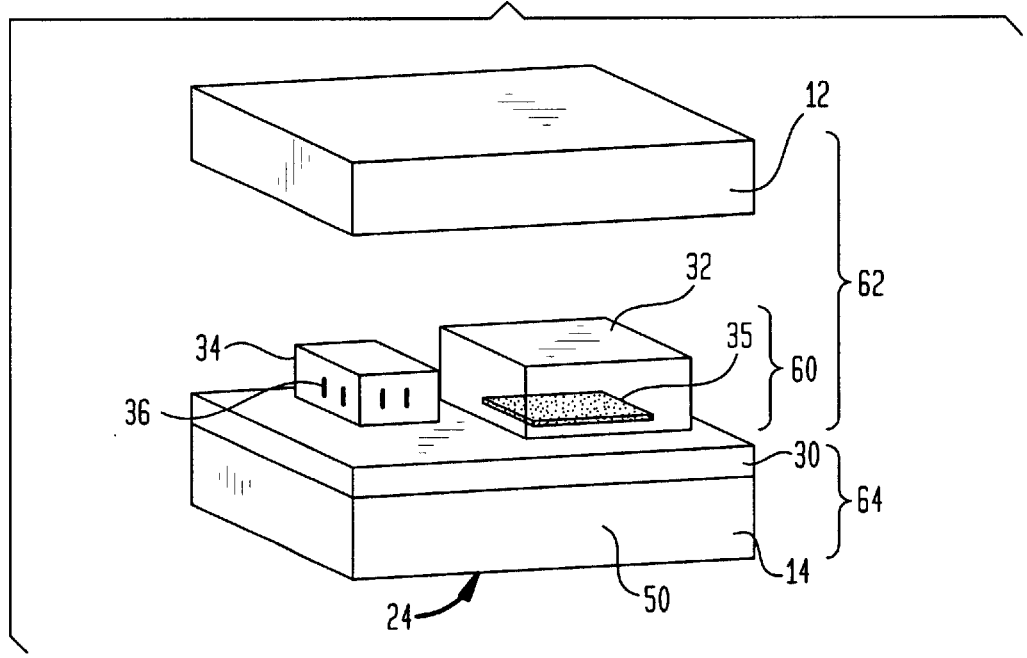

Referring to FIGS. 4A and 4B, the inventive dual enclosure unit and their method of use is shown schematically. In FIG. 4A, all components, (that is, the external face cover 12, shroud 14, base plate 30, internal cover 32, and access door 34) are shown in a disassembled position. The printed circuit board 35 is shown within the internal cover 32. When in use, the components are assembled following the arrows A of FIG. 4A so that the base plate 30 is secured over the peripheral edge 14*a* of the shroud as seen in FIG. 4B, distancing the circuit board 35 and field serviceable components 36 from the rear wall 24 of the shroud. It will be appreciated that an important consideration is that the equipment to be protected is encased in an inner enclosure unit meeting flammability requirements which is further surrounded and enclosed by the outer enclosure unit meeting weatherability requirements. Thus, two layers of enclosures surround the circuit board and field serviceable components from the outdoors. The base plate 30 and an enclosed cavity 50 of air separate the equipment from the rear wall of the external enclosure unit, and the internal cover 32 separates the equipment from the top face wall of the external enclosure unit.

Additionally, as can be seen in the figures, the dual enclosure unit can be described as in essence defining three separate enclosure units, a first internal enclosure unit 60, a second top enclosure unit 62, and a third rear enclosure unit 64. In particular, the base plate 30*a* defines the backwall for the first internal enclosure unit 60 which houses equipment such as the printed circuit board 35. The first surface of the base plate also defines a backwall for the second enclosure unit 62 that is used to surround the first enclosure, e.g., when cover 12 is placed over internal cover 32. The second surface of the base plate 30*b* together with the rear cover 14 define the third enclosure 64. This third enclosure provides a layer of insulating air between the rear wall 24 of the unit and the first and second enclosures where the equipment is maintained. As further can be seen, the base plate is suspended over the circumference of the peripheral edge of the rear cover unit. In this way, there is a complete enclosure providing a layer of air between the rear wall of the unit and the inner enclosures that house the equipment.

Preferably, the outer enclosure units 62, 64, and inner enclosure unit 60 are fabricated with different plastic materials relating to their functional requirements. The rear and face cover members 12, 14, for the outer units are advantageously fabricated with a plastic material resistant to degradation from contaminants and weathering for outdoor use. The term "weathering" as used herein encompasses influences from moisture (e.g., precipitation, humidity, and fog), ultra-violet rays, and temperature changes. The material used to fabricate these parts should remain stable at temperatures of −40° C. to 70° C. and should be resistant to impact, distortion, and corrosion from salt, fog, humidity, fungi, mold, and chemical contaminants. The flame retardancy of these external components is not critical since they are removed from the wiring or circuit board of the network. Since use of a flame-retardant agent often will reduce the weatherability of a polymer, this flexibility regarding the flame-retardancy of the external components enables fabrication of these components with a material having improved resistance to weathering. Additionally, materials having good weatherability typically are not suitable substrates for coating with conductive paints. With the dual configuration, it is not necessary to coat the outer enclosure unit for RF shielding and this coating may be placed over only the inner enclosure unit. This flexibility regarding the use of the conductive coating likewise enables fabrication of external components having improved resistance to weathering.

Advantageous materials for fabricating the external components comprise acrylonitrile-styrene-acrylate (ASA) or a multi-layered polymer structure of ASA and acrylonitrile-butadiene-styrene (ABS). ABS is compatible with, and yet less expensive than, ASA and therefore, use of ABS may reduce the cost of the device. For example, ABS may be used as a core layer disposed between two skin layers of ASA. Advantageously, the polymer structure comprises from 40 to 70% by volume ABS. Suitable ASA products for fabricating this structure are commercially available from BASF Corporation under the tradename LUJRAN S™ in grades 797S UV, 757G UV, and 796M UV. Suitable ABS products are commercially available from BASF under the tradename TERLURAN,™ grade 978T, and also from GE Plastics, a division of General Electric Corporation (GE), under the trade name CYCLOLAC T.™

A multi-layer polymer structure useful for this device is described in U.S. patent application Ser. No. 08/976,708, filed Nov. 24, 1997, titled "Multi-Layered Polymer Structure For Fabricating Housings for Communications And Electrical Products," which is hereby incorporated by reference. The '708 application claims a polymer structure for using in fabricating housing devices for communications equipment comprising a plurality of co-injection molded layers of ASA and ABS. In a preferred embodiment, a core layer of ABS is sandwiched between two skin layers of ASA, and in a further preferred embodiment, the structure comprises about 40 to 70% by volume (or thickness) ABS.

The polymer structure of the '708 application is advantageous over previously-described polymers, such as, for example a laminate structure described in U.S. Pat. No. 5,356,705 to Kelch. Kelch describes the coextrusion and lamination of extruded films or sheets of PVC and ASA, AES, or ABS, which in turn are thermally formed or shaped. (See, e.g., Kelch, col. 6). These co-extruded sheets produce two-dimensional structures that may be applied to two dimensional designs such as housing siding, but cannot be used to form three-dimensional housings for electronics. For example, Kelch shows a film that is laminated to a substrate 30 for siding. Additionally, in Kelch, the coextruded thermoplastic polymer undergoes multiple heating process steps. Consequently, the reliability of the polymer, its impact resistance, and ability to withstand weathering influences is substantially reduced as compared with the injection-molded product of the '708 application. Additionally, with the co-extrusion process, one cannot produce laminate structures having uniform thicknesses and thus, the product performance is varied (e.g., unreliable). The viscoelasticity of the polymers, copolymers, and their derivative blends differ during and after melt processing as between the coextrusion and monosandwich injection molding methods.

With the materials of the '708 application, a communications housing may be fabricated with a one-step monosandwich injection molding process. Thus, post-extrusion fabrication steps, such as thermal forming, are not required. The invention is advantageous in providing for an impact-resistant and weatherable product that could not be achieved with co-extrusion, and for enabling fabrication of three-dimensional structures having substantially uniform thicknesses for the unit walls. The invention allows for use of a substantial percentage (up to 70% by volume) of recycled polymer, ABS, thus reducing the cost of the device. Further, the structure ASA/ABS/ASA of the '708 application has an unexpectedly superior performance over a range of temperature differences as compared with monolayers of either ASA or ABS.

Another advantageous material that may be used to fabricate the external components comprises a polycarbonate (PC) and polybutylene terephthalate (PBT) blend. A PC/PBT blended product suitable for use in fabricating these components is available from GE under the tradename VALOX T. Preferably, the blended product comprises about 30–70% PC, about 20–40% PBT, with the remaining ingredients comprising additives such as impact modifiers and stabilizers.

In contrasts the internal components (the base plate 30, internal cover 32, and access door 34) need not exhibit the same degree of resistance to weathering as the external components. The internal components, however, preferably should exhibit heat deflection properties and be flame-retardant. The Underwriters' Laboratory (UL) 94 standards are known standards in the field for testing the flame retardancy of electrical devices, appliances, and telecommunications products. The UL standards also are described in M. Robert Christy, *Standards, Bans, and Flame Retardants*, Plastics Compounding (September/October 1993), at pp. 59–61, which is hereby incorporated by reference. It is desirable that the internal components be fabricated with a material meeting the UL94-5VA rating or a 5-inch flame test.

It also is advantageous to include load-bearing plastic features on the internal parts and to fabricate these parts with a material that is distortion resistant, will adhere to conductive paints for RF shielding, and will maintain sufficient flexibility at temperatures of −40° C. to −70° C. so that the parts may be hinged, snap-fit, or otherwise sealed together with use of plastic attachments. However, chemical resistance, impact resistance, and weatherability of these components are not critical, as they are fully enclosed within the external face cover 12 and shroud 14 and thereby protected from the outdoors. Inversely to the outer enclosure units, this flexibility regarding the weatherability of the internal components enables fabrication of these components with a material having improved flame retardancy. Also, these parts may be fabricated with a material that will provide a suitable substrate for conductive paints for RF shielding.

Materials suitable for use in fabricating the internal components comprise glass-filled polycarbonates (PC) and polyphenylene oxide (PPO). A PPO product suitable for use in fabricating these components is available from GE under the tradename NORYYL™. Also, to provide impact resistance and structural stability to the internal components, it is desired that glass-filaments, i.e. silica fibers, be compounded into the plastic. The use of glass fibers impregnated in a polymer as a method of providing a support structure is generally discussed in U.S. Pat. No. 4,761,053 to Cogelia, et als., issued Aug. 2, 1988, titled "Communications Transmission Media," assigned to AT&T Co. (a predecessor of the assignee herein), which is incorporated herein by reference. However, in this application, it is preferable to use raw silica fibers compounded into the plastic. A suitable material comprising a plastic containing glass filaments for use in fabricating the internal components is available from GE under the tradename LEXAN 500™.

All parts may be fabricated with an injection molded packaging design. Injection molding processes for fabricating plastic devices are well known. For example, a method of co-injection molding that may be used to fabricate a multi-layered polymer structure is described in U.S. Pat. No. 4,994,220 to Guthar et al., issued Feb. 19, 1991, titled "Process for Injection Molding of Injection Molded Parts of Plasticized Liquid Crystal Polymer Material," assigned to Ferromatick, which is hereby incorporated by reference. A mono-sandwich injection process or co-injection molding process may be used. The housing device configured with this dual enclosure structure and fabricated with plastic is lower in cost and lighter in weight than metal housings, yet it exhibits long operating life, excellent weatherability and chemical resistance at a wide range of temperatures, flame retardance, and EMI/RFI shielding.

It will be understood that the embodiments described herein are merely exemplary and that a person skilled in the art may make variations and modifications without departing from the spirit and scope of the invention. For example, although the invention is described with reference to a network interface unit for a telecommunications system, it is understood that it may be used in conjunction cable television interfaces or may contain a separate integrated compartment for a cable TV network. Also, the shroud 14 or rear portion may be used to house additional components. All such variations and modifications are intended to be included within the scope of the appended claims.

We claim:

1. A housing device for protecting communications or electrical equipment to be mounted outdoors, the device comprising:

a central base plate having first and second surfaces;

at least one internal cover member adapted to be mounted on the first surface of the base plate so that the first surface of the base plate comprises a back wall of a first enclosure defined by the central base plate and internal cover member for housing the communications or electrical equipment, the first enclosure being fabricated with a flame retardant material;

a face external cover member adapted to be mounted on the first surface of the base plate over the internal cover member so that the first surface of the base plate comprises a back wall of a second enclosure defined by the base plate and face external cover member, whereby the second enclosure surrounds the at least one internal cover member; and a rear external cover member adapted to be mounted on the second surface of the base plate so that the second surface of the base plate comprises a front wall of a third enclosure defined by the base plate and rear external cover member.

2. The housing device of claim 1, wherein the central base plate is configured so that the equipment is mounted on the first surface of the base plate, the base plate defines a central structural unit for the housing device whereby each of the face external cover member, rear external cover member, at least one internal cover member, and equipment are coupled to the central base plate.

3. The device of claim 1, wherein the face and rear external cover members are fabricated with a material having resistance from weathering including resistance to degradation from moisture, chemical contaminants, ultraviolet rays, and temperature changes of about −20° C. to 50° C.

4. The device of claim 1, wherein the internal cover member and central base plate are fabricated with a material having flame retardant properties.

5. The device of claim 1, wherein the internal and external cover members have a plurality of plastic attachments for securing the units together and to the central base plate.

6. The device of claim 5, wherein the housing device provides a weather-resistant seal over the equipment with plastic parts and attachments and without use of metallic enclosures or screws.

7. The device of claim 1, wherein the internal cover member is fabricated from a plastic material selected from the group consisting of glass-filled polycarbonates (PC) and polyphenylene oxide (PPO).

8. The housing device of claim 1 wherein at least one of the base plate, internal cover member, face external cover member and rear external cover member is fabricated with a polymer structure comprising a plurality of layers selected from the group of acrylonitrile-styrene-acrylate (ASA) and acrylonitrile-butadiene-styrene (ABS), wherein the plurality of layers are formed by an injection molding process comprising providing the ASA and ABS in a liquid state and injecting the liquid ASA and ABS into a mold to define a three-dimensional polymer structure having substantially uniform thickness.

9. The device of claim 1, further comprising a rim extending upwardly from the first surface of the base plate, the rim being so dimensioned in relation to the peripheral edge of the internal cover member that the internal cover member may be snap-fit over the rim and thereby retained on the base plate.

10. A housing device for protecting communications or electrical equipment to be mounted outdoors, the device comprising:

a face outer one-half shell cover unit;

a rear outer one-half shell cover unit having a peripheral edge, in which the face and rear one-half shell cover units when placed together define an external enclosure unit;

a substantially flat base plate having a first and a second surface, the second surface of the base plate being mounted over the circumference of the peripheral edge of the rear cover unit so that the second surface of the base plate and the rear cover unit define an enclosed cavity for providing an insulating cavity between the base plate and the rear outer one-half shell cover unit; and at least one internal cover mounted on the first surface of the base plate to thereby define a first enclosure being fabricated with a flame retardant material, the at least one internal cover located between the base plate and the face outer one-half shell cover unit for substantially enclosing and surrounding the equipment.

11. The device of claim 10 wherein the insulating cavity consists essentially of a layer of air.

12. The device of claim 10, wherein the internal cover and face and rear shell cover units each have one or more plastic attachments for securing the units together and to the base plate.

13. The device of claim 10, wherein the first surface of the base plate is configured for the mounting of at least one printed circuit board thereon.

14. The device of claim 10, wherein the face and rear external shell cover units are fabricated with a material having resistance from weathering including resistance to degradation from moisture, chemical contaminants, ultraviolet rays, and temperature changes of about −20° C. to 50° C.

15. The device of claim 10, wherein the internal cover and the base plate are fabricated with a material having flame retardant properties.

16. A housing device for protecting communications or electrical equipment to be mounted outdoors, the device comprising:

a base plate having a first surface and a second surface, an internal cover configured to be mounted on the first surface of the base plate to thereby define a first enclosure for substantially surrounding the equipment, the first enclosure being fabricated with a flame-retardant material;

a face external cover configured to be mounted on the first surface of the base plate over the internal cover, and a rear external cover configured to be mounted on the second surface of the base plate, whereby the face and rear external covers with the base plate therebetween define a second enclosure for substantially surrounding the first enclosure and the equipment, the face and rear external covers being fabricated from a material having resistance to degradation from weathering, wherein the equipment may be mounted on the first surface of the base plate, the first enclosure may be secured around the equipment to substantially enclose the equipment on all sides by the material having flame retardant properties, and the second enclosure may be secured around the first enclosure to substantially enclose the first enclosure with the material having resistance to degradation from weathering.

17. The housing device of claim 16 wherein at least one of the internal cover, the face external cover and the rear external cover is fabricated with a polymer structure comprising a plurality of layers selected from the group of acrylonitrile-styrene-acrylate (ASA) and acrylonitrile-butadiene-styrene (ABS), wherein the plurality of layers are formed by an injection molding process comprising providing the ASA and ABS in a liquid state and injecting the liquid ASA and ABS into a mold to define a three-dimensional polymer structure.

18. The device of claim 16, further comprising a second internal cover adapted to be mounted on the first surface of the base plate to define an access door.

19. The device of claim 18, further comprising a printed circuit board of a telecommunications system disposed between the base plate and the first internal cover, and a tip and ring telephony wire of a telecommunications system disposed between the base plate and the access door.

20. The device of claim 19, wherein vents are placed on one or more surfaces of the face external cover such that ventilation may be provided within the device while the internal cover substantially encloses the equipment and protects the equipment from precipitation entering the device.

* * * * *